Sept. 30, 1941. C. G. OLSON 2,257,479
METHOD OF ASSEMBLING FASTENER UNITS
Filed March 18, 1939
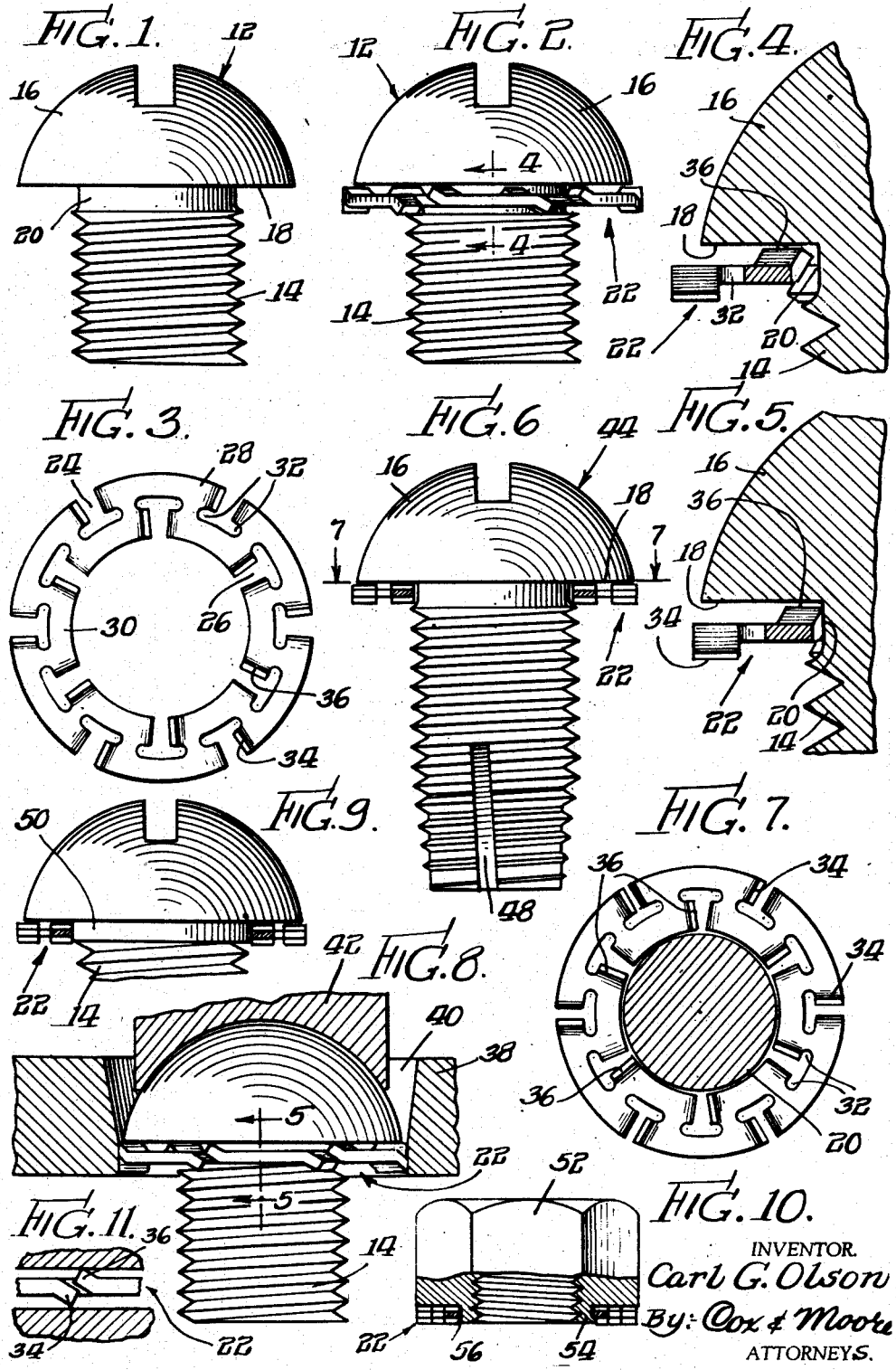
INVENTOR.
Carl G. Olson
By: Cox & Moore
ATTORNEYS.

Patented Sept. 30, 1941

2,257,479

UNITED STATES PATENT OFFICE 2,257,479

METHOD OF ASSEMBLING FASTENER UNITS

Carl G. Olson, Chicago, Ill., assignor to Illinois Tool Works, Chicago, Ill., a corporation of Illinois Application March 18, 1939, Serial No. 262,733

5 Claims. (Cl. 10—86)

The present invention relates to fastener units, and more particularly to fastener units of the type wherein a lock washer is permanently secured or fastened adjacent the clamping surfaces of a screw head or nut so as to present an assembled fastener and lock washer unit.

The present invention more specifically contemplates the provision and production of fastener units of the type referred to above, wherein the lock washer element is returned in position upon the fastener by an extruded element such as a thread convolution or by firm frictional clamping engagement of the periphery of the washer with adjacent washer receiving surfaces.

It is an object of the present invention to provide an assembly of the foregoing class by causing the washer to be contracted or reduced in diameter in order to cause permanent inter-engagement of the parts. It will be seen that the invention, therefore, contemplates an assembly method which may be applied to fasteners previously provided with thread sections by extrusion or cutting steps, for example, so that final inter-assembly is accomplished by deformation of the lock washer only. The invention may, therefore, be practiced with relatively hard, as well as relatively soft, fasteners, irrespective of whether the fastener has been subjected to the final hardening treatment before or after the assembly occurs.

The present invention additionally contemplates the provision of an assembly, as above, comprising lock washers of the character which may be reduced in diameter with the production of a minimum amount of strain and distortion. I propose to practice a method wherein I utilize the facility with which the diameter of these lock washers may be reduced, to associate them with great ease but at the same time permanently upon the fastener.

It is a specific object of the present invention to provide a fastener assembly of the foregoing character employing an overlapping tooth lock washer.

The foregoing and numerous other objects and advantages will be more apparent from the following detailed description when considered in connection with the accompanying drawing, wherein—

Figure 1 is an elevational view of a screw suitable for practicing the principles of the present invention;

Figure 2 is an elevational view of a screw having arranged thereon in operative relationship a lock washer adapted to be reduced in diameter but before such a time as forces to cause the reduction in the diameter have been applied;

Figure 3 is a plan view of the lock washer shown in Figure 2;

Figure 4 is a fragmentary sectional view taken along the line 4—4 of Figure 2;

Figure 5 is a fragmentary sectional view taken on the same plane as Figure 4 showing the relative association of lock washer and fastener after reduction in diameter of the lock washer;

Figure 6 is an elevational view showing the present invention as applied to an alternative type of screw fastener, the forward portion of the lock washer have been broken away to show its association with the fastener;

Figure 7 is a view taken on the line 7—7 of Figure 6;

Figure 8 is a sectional view taken through a mechanism for reducing the washer diameter, and illustrates a lock washer and screw assembly at the moment of passing through the die for this purpose;

Figure 9 is an elevational view of a modified lock washer and fastener assembly embodying the present invention, the forward half of the lock washer having been broken away to bring out the inter-engagement of the parts;

Figure 10 is an elevational view of a nut, illustrating the application of the present invention to a fastener of the internally threaded type, the lower portions of the nut having been broken away to illustrate the mounting of a lock washer thereon; and Figure 11 is a fragmentary elevational view disclosing the washer teeth in overlapping relation.

Referring now to the drawing more in detail wherein like numerals have been employed to designate similar parts throughout the various figures, it will be seen that the present invention contemplates the association of a lock washer upon a fastener screw, in order to provide a permanent assembly. One form of screw to which the principles of the present invention may be applied, is shown in Figures 1, 2, 4, and 5 and is designated by the reference numeral 12. The illustrated screw comprises a threaded shank portion 14 and an integral extruded head 16. The lower face of the head provides clamping surface 18 extending radially outwardly from the shank portion, this surface, as is usual with fasteners of this class, being adapted to exert a clamping force in cooperation with a suitable opposed work surface.

The peripheral portion of the shank 14 in the vicinity of the clamping surface 18 is designed to receive and retain the inner periphery of a washer, as will hereinafter appear more in detail. To this end it will be noted that this peripheral receiving portion, which is designated by the reference numeral 20, is in the present instance of cylindrical form. Yet more particularly attention is directed to the fact that the diameter of the peripheral receiving surface 20 is slightly less than the outer peripheral diameter of the thread sections on the shank 14. It will be understood that this particular shank configuration may be readily obtained by virtue of the thread extrusion process, which tends to raise the periphery of the thread sections beyond the normal surface from which they are extruded. On the other hand, the invention obviously is not limited to this method of formation, wherefore the shank structure disclosed may be produced by any desired forming or cutting operation.

As shown in Figure 2, the foregoing screw fastener is adapted to receive in association therewith a lock washer 22. The particular lock washer shown in Figures 2 to 5, inclusive, for purposes of illustration, is an annular element provided with outer cut-outs or notches 24 and inner notches 26. The sections extending between the notches 24 are designated by the reference numeral 28, and the sections extending between the notches 26 are designated by the reference numeral 30. It should be noted that the bottom portions of the notches 24 and 26 are laterally removed as at 32 to enable the washer stock bordering the notches to be bent, warped, or twisted out of the plane of the washer so as to present work engaging teeth 34 and 36. The teeth 24 in the present embodiment present work engaging edges rather than sharp corners, and these work engaging edges are arranged in a plane generally parallel with the plane of the washer, as a result of which it will be obvious that the teeth are adapted to make a line bite into adjacent work surfaces for promoting tooth locking efficiency. The sections 28 and 30 provide the necessary rigid support, as well as resiliency, to render the teeth particularly adaptable for their intended purpose, namely, for securing rotary threaded fasteners against retrograde rotation.

Reference to Figure 4 of the drawing discloses that the washer 22 as initially associated with the fastener has an inner peripheral diameter greater than the maximum diameter of the threaded convolutions, wherefore the washer is freely shiftable axially of the screw shank to position with its work engaging teeth against the clamping surface 18. It is particularly important to note that the instant lock washer construction is such as to greatly facilitate the reduction in diameter of the washer by peripherally applied forces. That is to say, by the application of the necessary peripheral stress in a direction to force the lock washer periphery inwardly, the opposed teeth along the margin of each notch tend to peripherally approach each other. By virtue of their oppositely bent or warped configuration the opposed edges of the notches tend to approach in overlapping relationship, so that even the peripheral coincidence of the opposed teeth does not impede the facility with which the reduction in diameter takes place.

It will be seen, upon consideration of Figure 5, that the present invention contemplates the permanent assembly of the foregoing lock washer 22 upon the screw shank 12 through a reduction in diameter of the washer, causing it to approach the lock washer receiving portion 20 of the shank while assuming an inner peripheral dimension less than the outer diameter of the adjacent thread sections. The thread section, therefore, obviously acts as an abutment flange or protuberence, positively and permanently retaining the washer axially adjacent the clamping surface 18.

In Figure 8 I have shown one device in which the lock washer may be reduced in diameter. This device in the elementary form disclosed comprises a die 38 provided therein with an aperture or hole 40 which, in the embodiment shown, forms a perfect circle at all horizontal sections but which tapers in an axial direction. The upper portion of the tapered aperture 40 has a diameter sufficient to readily accommodate the original lock washer. The elements as assembled in Figure 2 are accordingly located in the aperture in the relationship shown in Figure 8, and an axial force is applied through the agency of a plunger 42 to carry the fastener assembly completely through the aperture as the tapered wall portions of the aperture function to displace the entire body of the lock washer radially inwardly.

It is particularly important to note that the present lock washer being of the type adapted to be reduced in diameter by external force will be sufficiently set to become permanently associated with the screw as shown in the accompanying figures, even though previously hardened and tempered. The present invention accordingly is applicable to the assembly of lock washers and fasteners, the manufacturing steps of which have been completed, including the final steps of heat treatment. So also, as indicated above, it should be noted that the principles of assembly herein disclosed, apply equally well to hardened fasteners having threads adapted to cut or form complementary thread sections in associated work, which fasteners normally resist assembly operations requiring the shifting of the material forming the body of the shank or head. At the same time, however, it must be remembered that the present invention is equally applicable to manufacturing processes wherein the screw and lock washer are hardened after assembly.

I have illustrated in Figure 6 a lock washer and screw assembly, which exemplifies for illustrative purposes an assembly comprising a lock washer 22 and a fastener of the thread forming type designated by the reference numeral 44. It should be noted that the threaded shank 46 of the screw tapers at its lower end both as to the root, as well as the peripheral, diameter of the thread. A slot 48 extends transversely in a slight inclination to the shank axis across a substantial number of thread convolutions providing thread cutting and forming edges adjacent the entering end of the fastener.

Figure 7 particularly shows the engagement of the reduced diameter of the washer upon the receiving portion of the shank with the biting edges or teeth 34 and 36 positioned adjacently; and in Figure 11 with said teeth in overlapping relationship.

There is shown in Figure 9 a further modified form of lock washer and fastener assembly, in which the washer receiving surface portion of the screw shank has a diameter greater than the outer diameter of the screw thread. As compared with the previously described embodiments wherein the thread convolutions form, in effect, a raised abutment retaining the washer in axial position upon the shank, the present assembly necessarily depends for its permanence upon the frictional gripping engagement between the inner periphery of the lock washer and the axially extending peripheral receiving surface. Referring more particularly to the figure, it will be seen that the washer receiving peripheral portion is designated by the reference numeral 50, the lock washer being disclosed in its ultimate assembled condition, namely, having been previously subjected to an external force, reducing its diameter as hereinbefore described. It will be obvious from the foregoing that it is necessary to apply a sufficient diameter reducing external force to cause the resulting washer to reside in tight fitting relationship upon the screw shank. That is to say, the washer is provided with a sufficient permanent reduction in diameter to assure the continued application of peripherally exerted stresses.

Figure 10 discloses the principles of the present invention applied to a rotary fastener of the internally threaded type. The fastener comprises a multi-sided nut 52 having an axial extension or lock washer holding portion 54. The etxension 54 at its lower end is headed over slightly adjacent its outer peripheral edge to provide an annular burr or flange 56. The assembly of the lock washer 22 with the nut 52, and specifically upon the holding portion 54, may be carried out in accordance with the steps heretofore described in detail.

Attention is directed to the fact that the reduction in diameter of the lock washer is greatly facilitated by reason of the fact that the body is notched a distance equal to substantially more than half its radial width. The present method of assembly may accordingly be carried out with great ease and facility, employing washers not only of this type but of equivalent structures wherein slits, for example, are substituted for notched portions 24 and 26. It may be said that washers of this particular type are annularly discontinuous; that is, they do not comprise a continuous strip of material extending in any one annular direction. Annularly discontinuous lock washers are also formed from elongated stock, such as flat or wire stock, and these, likewise, are readily reduced in diameter by external forces. In other words, by having the prongs positioned along both the inner and outer margins of the washer in the manner described so as to render the body of the washer discontinuous in an annular direction, the entire structure may be reduced in diameter without subjecting the main body of the washer to substantial compression. So also, the fact that the prong sections are in position to slide over one and other when force is applied to the outer periphery of the washer in inner radial direction, precludes the necessity of subjecting the main body of the washer stock to any deleterious compressive strains. Thus no substantial straining of the metal takes place, although a reduction in diameter is experienced.

Various devices may be employed to effect reduction in diameter of the lock washers in substitution for the step of forcing the washer through a tapered aperture, as hereinbefore described.

In view of the fact that the present invention is not concerned with the specific form of dies, punches, and the like which may be employed in practicing the present improved method, no illustration is made of these devices. It will suffice to say, however, that the invention contemplates the use of various forms of devices for carrying out the present improved method of reducing lock washer assemblies.

It will be apparent that this invention is particularly adaptable for the use of lock washers having a continuous body portion while being discontinuous or of a zigzag configuration in an annular direction. By having the lock washer continuous in form, the assembly becomes permanent and a firm binding or frictional holding of the inner margin of the lock washer against the complementary periphery holding portion of the screw shank is assured in those embodiments such as Figure 9, wherein axially retaining abutment means is omitted.

The term "closed, continuous" as applied to the washer defined is intended to cover those forms of washers having a continuous body adapted to surround the fastener shank as distinguished from the split ring type of washer formed merely of a discontinuous elongated band.

Obviously the invention is not limited to the specific structural arrangement disclosed herein, but is capable of other modifications and changes wtihout departing from the spirit and scope of the present invention.

The invention is hereby claimed as follows:

1. The method of preassembling a closed, continuous flat type washer with a shank of less diameter than the internal washer diameter and extending axially beyond the clamping surface of a rotary threaded fastener, which consists in telescoping said washer and shank, exerting pressure along the outer margin of the washer toward the washer axis so as to cause the inner margin of the washer to be shifted into operative association with said shank portion, and maintaining said washer in its normally flat state during the application of said pressure.

2. The method of preassembling a closed, continuous flat type washer with a shank extending axially beyond the clamping surface of a rotary threaded fastener, the shank being of reduced diameter adjacent said clamping surface and the internal diameter of the washer being at least as great as the maximum diameter of said shank, which consists in telescoping said washer and shank, exerting pressure along the outer margin of the washer toward the washer axis so as to cause the inner margin of the washer to be shifted into overlying relationship with respect to the portion of the shank of larger diameter, and maintaining said washer in its normally flat state during the application of said pressure.

3. The method of preassembling a closed, continuous flat type washer having a plurality of marginal severances disposed along the inner and outer margins thereof presenting a plurality of connected annularly disposed sections of washer stock with a screw shank immediately beneath the clamping surface of the head thereof, said shank having a washer receiving portion in the immediate vicinity of said clamping surface of less diameter than the internal diameter of the washer, which consists in telescoping said washer and screw shank, exerting pressure along the outer margin of the washer toward the washer axis so as to cause the inner margin of the washer to be shifted into operative association with said peripheral washer receiving portion of the shank, and maintaining said washer in its normally flat state during the application of said pressure.

4. The method of preassembling a flat type, closed, continuous washer having a plurality of marginal severances presenting a plurality of connected annularly disposed sections of washer stock with the shank of a screw adjacent the clamping surface of the head thereof, the screw shank in the immediate vicinity of said clamping surface presenting a peripheral washer receiving portion of reduced diameter, which consists in telescoping said washer and screw shank, exerting a pressure along the outer margin of the washer toward the washer axis so as to cause the inner margin of the washer to be shifted toward said reduced peripheral portion into overlying relation with respect to the larger portion of the screw shank, and maintaining said washer in its normally flat state during the application of said pressure.

5. The method of preassembling a flat type, closed, continuous lock washer having marginal severances presenting a plurality of circumferentially spaced marginal locking teeth with a shank of less diameter than the internal washer diameter and extending axially beyond the clamping surface of a rotary threaded fastener, which consists in telescoping said lock washer and shank, exerting a pressure along the outer margin of the washer toward the washer axis so as to cause the washer teeth to be shifted circumferentially and the inner margin of the washer shifted into operative association with said shank portion, and maintaining said lock washer in its normally flat state during the application of said pressure.

CARL G. OLSON.